United States Patent [19]

Babler

[11] 3,927,076
[45] Dec. 16, 1975

[54] METHOD OF REARRANGING TERTIARY VINYL CARBINOLS

[75] Inventor: James H. Babler, Evanston, Ill.

[73] Assignee: Research Corporation, New York, N.Y.

[22] Filed: Dec. 26, 1973

[21] Appl. No.: 427,450

[52] U.S. Cl.... 260/488 R; 260/488 CD; 260/488 H; 260/489; 260/617 R; 260/618 R; 260/618 D; 260/633; 260/638 R
[51] Int. Cl.² .................. C07C 29/00; C07C 67/08
[58] Field of Search............ 260/489, 488 H, 488 R, 260/488 CD, 617 R, 618 R, 618 D, 638 R, 633

[56] References Cited
UNITED STATES PATENTS

| | | | |
|---|---|---|---|
| 2,423,545 | 7/1947 | Aeschbach | 260/489 |
| 3,661,978 | 5/1972 | Gradeff et al. | 260/489 |

*Primary Examiner*—Vivian Garner
*Attorney, Agent, or Firm*—Dennis P. Clarke

[57] ABSTRACT

A method of re-arranging a tertiary vinyl carbinol having the structure:

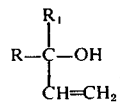

by reacting the carbinol with a lower alkanoic acid, anhydride thereof or a mixture thereof in the presence of an acid catalyst to produce a re-arranged compound having the structure:

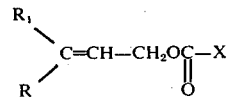

wherein X is the residue of the acid reactant. The resulting ester may be saponified to produce a compound having the structure:

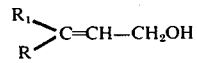

which is the allylic isomer of the original vinyl carbinol.

9 Claims, No Drawings

METHOD OF REARRANGING TERTIARY VINYL CARBINOLS

BACKGROUND OF THE INVENTION

It has been heretofore proposed to rearrange tertiary vinyl carbinols to the corresponding allylic alcohol by a variety of methods.

In U.S. Pat. No. 3,355,505, it is disclosed that tertiary vinyl carbinols may be rearranged to the allylic alcohol isomer by passing the former through an isomerization zone containing an acidic ion exchange resin catalyst. The process suffers from the disadvantages that it requires specialized apparatuses and techniques, as well as relatively expensive ion exchange resin catalyst systems and results in relatively low yields of the isomerized product. A further disadvantage lies in the fact that the product contains non- rearranged vinyl carbinol which is difficult to separate from the desired allylic isomer product.

It has also been proposed to effect the rearrangement in the presence of a variety of acidic catalysts such as aqueous sulfuric acid, etc. (J. Gen. Chem. USSR, 26, 1343 (1956); Dimroth, Ber., 71, 1333 (1938); *The Terpenes*, Volume 1, edited by J. L. Simonsen (Cambridge University Press: 1947), pages 58–63 and references cited therein; I. N. Nazarov, et al, *Bull. Acad. Sci. USSR, Classe Sci. Chim.*, page 419 (1946); E. A. Braude, *Quart. Rev.*, 4, 404 (1950). All of these proposed methods result in poor yields of the allylic isomer and all suffer from the disadvantage that the product is contaminated with unrearranged tertiary isomer.

Since many of the allylic alcohol isomers are important in the odorant field, it is essential that the process employed to rearrange the corresponding tertiary vinyl carbinol be one which results in the production of a product uncontaminated with the unrearranged isomer.

It is an object of the present invention to provide a process for the rearrangement of tertiary vinyl carbinols to the corresponding allylic isomer or derivative thereof wherein the product is uncontaminated with the unrearranged isomer.

SUMMARY OF THE INVENTION

The objects of the invention are achieved by reacting a tertiary vinyl carbinol having the structure:

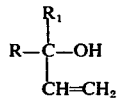

with a liquid lower alkanoic acid, anhydride thereof or a mixture thereof in the presence of a catalytic amount of a strong acid for a time sufficient to produce a rearranged compound having the structure:

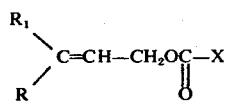

wherein:

$R$ and $R_1$, which may be the same or different, represent alkyl, vinyl, aryl, cycloalkyl, cycloalkene, or taken together with the carbon atom to which they are attached form a cycloalkyl group, all being optionally substituted with halogen and X is the lower alkyl residue of the lower alkanoic acid.

The above ester may be saponified in an alkaline medium to provide the allylic isomer corresponding to the original tertiary vinyl carbinol.

The process is highly advantageous over those previously proposed in that the product ester and allylic alcohol are uncontaminated with unrearranged reactant, i.e., the ester product contains only the allylic ester uncontaminated with the ester of the tertiary vinyl carbinol and the saponified product contains only the allylic alcohol uncontaminated with tertiary vinyl carbinol.

DETAILED DESCRIPTION OF THE INVENTION

The tertiary vinyl carbinols which may be rearranged according to the method of the present invention are those having the structure:

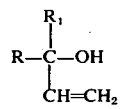

where R and $R_1$ have the meanings set forth above.

The preferred carbinols are those wherein R and $R_1$ are lower alkyl, vinyl, cycloalkyl or cycloalkyl substituted with lower alkyl groups, cycloalkene or cycloalkene substituted with lower alkyl groups, phenyl and phenyl substituted with lower alkyl groups.

The carbinols are reacted with a liquid lower alkanoic acid, anhydride thereof or mixtures thereof. The most preferred alkanoic acid or anhydride is acetic acid and acetic anhydride. The most preferred reactant is a mixture of acetic acid and acetic anhydride. It is to be understood, however, that other liquid lower alkanoic acids such as propionic acid may be employed.

The amount of alkanoic acid or anhydride employed is not overly critical. It is only necessary that sufficient acid or anhydride be present to result in a complete solution of the tertiary vinyl carbinol starting material. Since, however, water is liberated during the reaction it is desirable that an excess of alkanoic acid or anhydride be employed. The presence of anhydride in the reaction mixture is particularly advantageous since it acts to bind the water liberated during the reaction. Generally, an amount of acid, anhydride or mixture thereof is employed to result in a solution which is 0.1 to about 5M with respect to the tertiary vinyl carbinol. Of course, the reaction medium should be maintained as anhydrous as possible.

The reaction is preferably carried out at room temperature or below in order to avoid side reactions. Generally, temperatures in the range from about 0°C to about room temperature are employed. It has been discovered, however, that where the starting tertiary vinyl carbinol is unsymmetrical (i.e., $R \neq R_1$), the reaction is more stereoselective (i.e., produces the trans configuration in the allylic isomer) if low temperatures are employed. Thus, although longer reaction times are required where lower temperatures are utilized, where stereoselectivity is desired, temperatures just above the freezing point of the solvent acid may be employed.

The catalyst employed may be any strong acid, i.e., any acid having an ionization constant above $1 \times 10^{-4}$. Suitable catalyst include sulfuric acid, p-toluenesulfonic acid, phosphoric acid, etc. Trace amounts of catalyst are sufficient to insure rearrangement of the tertiary vinyl carbinol. Generally, amounts sufficient to render the solvent solution of the tertiary vinyl carbinol 0.001 to about 0.1 molar with respect to the acid catalyst are sufficient.

The process of the invention results in a rearranged product completely uncontaminated with the unrearranged isomer. While not wishing to be bound by any theory or mechanism, it is postulated that the allylic isomer appears to the total exclusion of the vinyl tertiary isomer due to the fact that the double bond is in a more stable position in the allylic isomer than in the tertiary vinyl isomer. Moreover, steric hindrance operates to prevent esterification of the hydroxyl group when in the tertiary position in the starting material. In any event, the process of the invention is the first such process proposed to date which results in high yields of the rearranged isomer uncontaminated with the unrearranged tertiary isomer.

The isomer may be separated from the reaction mixture according to any conventional means. For example, the reaction mixture may be quenched by pouring into water and the rearranged isomer ester isolated by extraction with a suitable solvent. It is to be understood, however, that any conventional method of isolation may be employed to separate the resulting ester product.

The ester is advantageously saponified according to conventional methods into the corresponding allylic alcohol which is the allylic isomer of the original tertiary vinyl carbinol. Saponification may be achieved by contacting the ester with an aqueous alcoholic solution containing an alkaline agent such as potassium hydroxide, sodium hydroxide, potassium carbonate, etc. A suitable saponification medium comprises an aqueous methanol or aqueous ethanol solution. The isomeric alcohol may be isolated therefrom by quenching in water and extracting with ether.

The tertiary vinyl carbinols may be prepared according to well-known methods, for example, by reacting the corresponding ketone with a vinyl lithium compound.

The invention is illustrated by the following non-limiting examples.

10.0 mmol of the starting material set forth in Table 1 below is dissolved in 25 ml of glacial acetic acid which is then rapidly added with stirring to a mixture of 25 ml of acetic acid and 10 ml of acetic anhydride containing 600 mg of p-toluenesulfonic acid monohydrate. The reaction mixture was maintained at room temperature for ten minutes and then quenched by pouring into 10 volumes of water. The product was isolated from the quenched mixture by extraction with pentane. The results are set forth in Table 1 below. IR, NMR and VPC analyses indicated that all of the products were uncontaminated by corresponding tertiary acetate.

TABLE 1

| Starting Material | Structure | Dist. Yield (%) | Reac. Time (min) | Rearranged 1° Acetate Reac. Temp. (°C) | $^1$H—NMR (CCl$_4$ TMS, δ in ppm) |
|---|---|---|---|---|---|
| (CH$_3$CH$_2$CH$_2$)$_2$C(OH)—CH=CH$_2$ | (CH$_3$CH$_2$CH$_2$)$_2$C=CHCH$_2$OCOCH$_3$ | 65 | 30 | 20° | 1.97(s,OCCH$_3$); 4.52(d,J=7 Hz, —CH$_2$O—); 5.32(t, J=7 Hz, C=CH) |
| cyclohexyl-C(OH)(CH=CH$_2$) | cyclohexylidene=CHCH$_2$OCOCH$_3$ | 55 | 10 | 20° | 1.97(s,OCCH$_3$); 4.51(d, J=7 Hz, CH$_2$O); 5.25(t, J=7 Hz, C=CH) |
| φ—C(OH)(CH$_3$)—CH=CH$_2$ | (φ)(CH$_3$)C=C(H)(CH$_2$OCCH$_3$) | 91 | 4 | 20° | 2.01(s,OCCH$_3$); 2.12(s,C=CCH$_3$); 4.71(d,J=7 Hz, CH$_2$O); 5.86(t, J=7 Hz, C—CH) |
| CH$_3$—C(OH)(CH=CH$_2$)—(CH$_2$)$_4$CH$_3$ | (CH$_3$)(CH$_3$(CH$_2$)$_4$)C=CHCH$_2$OCCH$_3$; E:Z ratio was 70:30 | 70 | 25 | 0° | 1.97(s,OCCH$_3$); 1.70(s,W/2 = 4 Hz, C=CCH$_3$);4.50 (d, J=7 Hz,CH$_2$O) 5.31(t,J=7 Hz, C=CH) |
| CH$_2$=CH—C(OH)(CH$_3$)—CH=CH$_2$ | (CH$_2$=CH)(CH$_3$)C=CHCH$_2$OCCH$_3$; E:Z ratio was 75:25 | 75 | 20 | 0° | 1.98(s,OCCH$_3$); 1.83 (broad singlet, C=CCH$_3$); 4.64(d, J=7 Hz, CH$_2$O) |

A millimole of each of the acetates in Table 1 above and 4 millimoles of potassium hydroxide were dissolved in 3 ml of 70:30 methanol/water and stirred under reflux for 10 minutes. The reaction mixture was quenched in water and the allylic alcohol saponification product corresponding to the tertiary carbinol starting material was obtained in each instance in high yield by extraction with ether.

The tertiary carbinols in Table 1 were obtained by the dropwise addition of a 1M ether solution of the corresponding ketone to a 10 percent excess of a 2M solution of vinyllithium in THF at 0°C.

The E:Z [i.e., trans:cis] ratio in the above Table 1 was determined by VPC analysis of the acetate mixture and the corresponding mixture of alcohol stereoisomers obtained by saponification. For the fourth entry in Table 1 the ratios given are consistent with the NMR integration of the vinyl methyl signals for these previously characterized alcohols. See: Ogura et al, J. Amer. Chem. Soc., 92, 6036 (1970).

For the last entry in Table 1, where the reaction was run for 5 minutes at room temperature, the ratio of E:Z stereoisomers was 70:30, thereby indicating that the lower the temperature, the more stereoselective the reaction is.

It is to be understood that the order of addition of reagents to the reaction mixture is relatively unimportant. The starting material may be added in alkanoic acid solution to a solution of the catalyst as in the above examples. Alternatively, the catalyst may be added to the acid solution of the starting tertiary vinyl carbinol. It is only desirable that substantially anhydrous conditions be maintained and that the reaction temperature be maintained at or below substantially room temperature.

The allylic alcohols produced according to the process of the invention have a wide variety of applications. Many are useful in the odorant and flavor industry. The last compound set forth in Table 1 is a valuable intermediate for the preparation of Vitamin A. The first alcohol set forth in Table 1 is an intermediate for the synthesis of propylure.

What is claimed is:

1. A method of rearranging a tertiary vinyl carbinol having the structure:

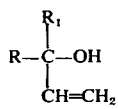

comprising reacting said vinyl carbinol with a liquid lower alkanoic acid, anhydride thereof or a mixture thereof at from about 0°C to about room temperature in the presence of a catalytic amount of a strong acid having an ionization constant above about $1 \times 10^{-4}$ for a time sufficient to produce a rearranged compound having the structure:

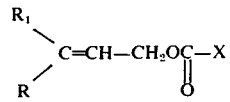

substantially uncontaminated with non-rearranged compound wherein:

R and $R_1$, which may be the same or different, represent alkyl, vinyl, phenyl, cycloalkyl, cycloalkenyl, lower alkylphenyl, lower alkylcycloalkyl, lower alkylcycloalkyenyl or taken together with the carbon atom to which they are attached form a cycloalkyl group, all being optionally substituted with halogen and X is the lower alkyl residue of said lower alkanoic acid.

2. The method of claim 1 wherein said vinyl carbinol is reacted with a mixture of lower alkanoic acid and the anhydride thereof.

3. The method of claim 2 wherein said mixture comprises a mixture of acetic acid and acetic anhydride.

4. The method of claim 1 wherein said vinyl carbinol is reacted with acetic acid.

5. The method of claim 1 wherein said vinyl carbinol is reacted with acetic anhydride.

6. The method of claim 1 wherein said strong acid is sulfuric or p-toluenesulfonic acid.

7. The method of claim 1 wherein said reaction is conducted for a time up to about 24 hours.

8. The method of claim 1 including the step of saponifying the product ester to produce a compound having the structure:

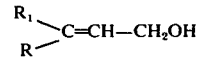

which is the allylic isomer of the vinyl carbinol starting material and which is substantially uncontaminated with non-rearranged alcohol.

9. The method of claim 8 wherein said saponification is conducted in an alkaline medium.

* * * * *